(No Model.) 2 Sheets—Sheet 1.

B. CHAMBERLAIN.
WINDMILL.

No. 252,835. Patented Jan. 24, 1882.

Fig 1ª.

Attest:
Geo. T. Smallwood Jr.
L. M. Hopkins.

Inventor:
Blanchard Chamberlain.
By Knight Bros
atts (No Model.) 2 Sheets—Sheet 2.

B. CHAMBERLAIN.
WINDMILL.

No. 252,835. Patented Jan. 24, 1882.

Attest:
Geo. T. Smallwood Jr.
L. M. Hopkins.

Inventor:
Blanchard Chamberlain
By Knight Bros
attys

UNITED STATES PATENT OFFICE.

BLANCHARD CHAMBERLAIN, OF BELLEFONTAINE, OHIO, ASSIGNOR TO JOSEPH H. WILSON, OF SAME PLACE.

WINDMILL.

SPECIFICATION forming part of Letters Patent No. 252,835, dated January 24, 1882.

Application filed October 18, 1881. (No model.)

*To all whom it may concern:*

Be it known that I, BLANCHARD CHAMBERLAIN, a citizen of the United States, residing at Bellefontaine, in the county of Logan and State of Ohio, have invented a new and useful Improvement in Windmills, of which the following is a specification.

My improvement consists, first, in a windmill in which is combined a hollow hub having a flange, radial arms extending therefrom, concentric rings secured to the arms, radial shafts carrying sails and having bearings on the innermost and outer rings, intermediate shafts carrying sails, and having bearings on the two outer rings, and rods connecting the sails in pairs or sections, as hereinafter described.

My improvement consists, further, in the combination of a hollow hub having a flange, radial arms extending therefrom, three concentric rings secured to the arms, radial shafts mounted on the rings and formed with crank-arms and wrists, rotating collar, rods connecting the wrists with the collar, presser-rod having fixed collars, short shafts mounted on the two outer rings, and suitable sails in pairs or sections connected by rods, as hereinafter described.

My improvement consists, further, in combining with feathering sails, connecting-rods, and rotating collar, a horizontal presser-rod having a slot and fixed collars on each side of the rotating collar, and a fixed collar to limit the inward movement of the presser-rod, lever extending from a fulcrum on the housing and passing through the slot in the rod, a spring located on the rod between the lever and a fixed collar, and a governor-rod depending through the housing from a chain working over a pulley and connected to the upper end of the lever, as hereinafter described.

My improvement consists, further, in combining a housing having a pawl on its under side and containing the mill-gearing, a rack mounted on the pedestal, and a hinged vane provided with a tripping device engaging beneath the inclined head of the pawl, as hereinafter described.

In order that my invention may be fully understood, I will proceed to describe it with reference to the accompanying drawings, in which—

Figure 1:
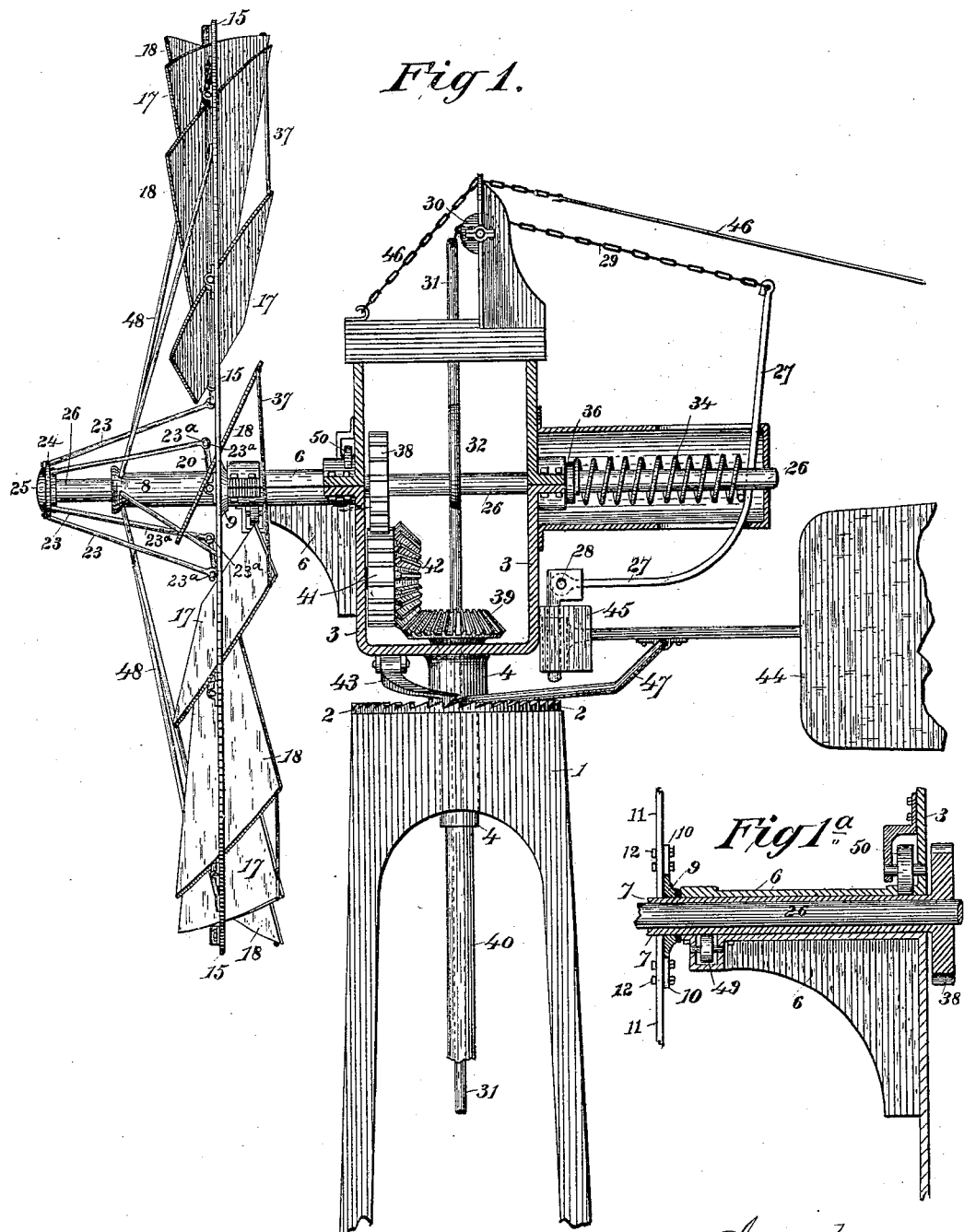
Figure 2:
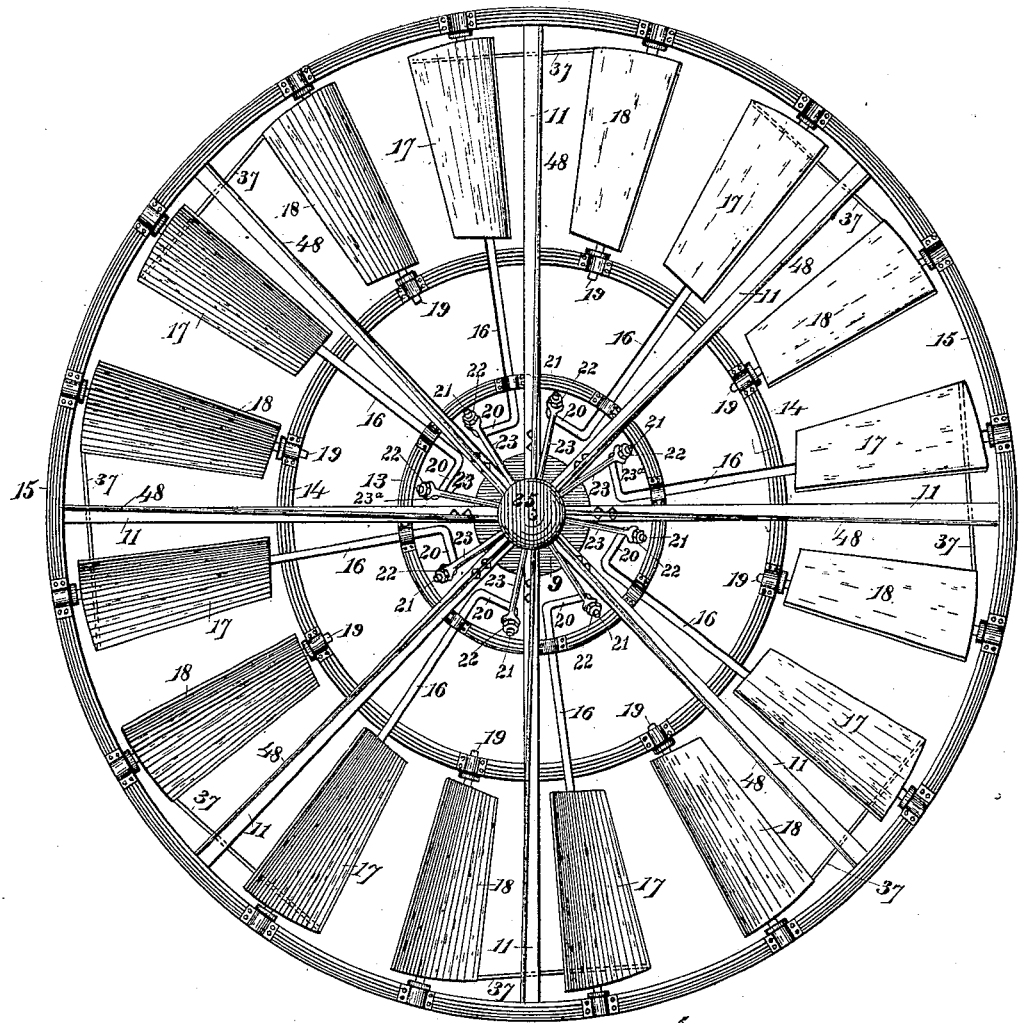
Figure 3:
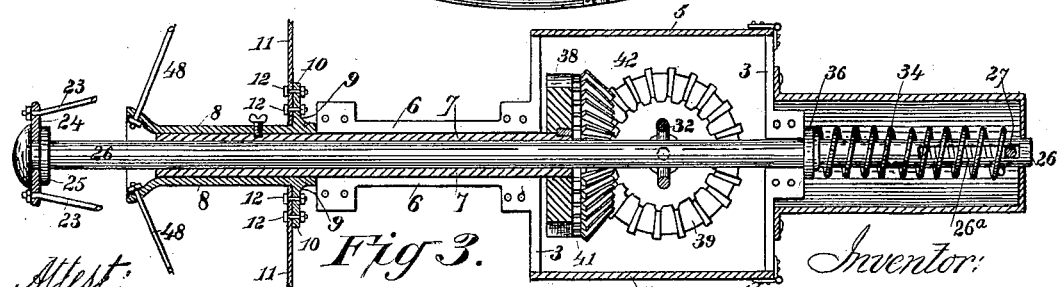

Figure 1 is a side view of the mill, partly in vertical section. Fig. 1ª is a vertical longitudinal section of the shaft-bearing and accessories on a larger scale. Fig. 2 is a front view of the wind-wheel. Fig. 3 is a horizontal section of the central part of the wheel and its accessories.

The vertical socket of the mill is mounted in a tower or pedestal, 1, in any usual or suitable manner. The top plate, 2, of the socket is formed with ratchet-teeth, constituting a circular rack.

The head of the mill consists of a housing, 3, carried by a vertical hollow spindle, 4, shouldered to rest on the top plate, 2, and turning within the socket in customary manner. The housing 3 contains the gearing of the mill, as hereinafter described, and is closed by doors 5 5, so as to inclose said gearing. In a bearing-bracket, 6, extending horizontally from the front of the housing 3, is mounted the hollow shaft 7 of the wind-wheel.

The cast-iron hub 8 of the wheel is keyed on the hollow shaft 7, and formed with a flange, 9, from which project short radial arms 10 to receive the radial wrought-iron arms 11 of the wheel, said arms 11 being securely fastened to the flange 9 and its arms 10 by screw-bolts 12 12.

To the arms 11 are fixed three concentric rings, 13 14 15, in which are mounted the radial shafts 16, to which the sails 17 are fixed eccentrically—that is to say, with the shaft nearer one side of the sail than the other.

18 represents intermediate sails, mounted in similar eccentric position on short shafts 19, having their bearings in the outer two concentric rings, 14 15.

On the inner ends of the sail-shafts 16 are crank-arms 20, which, in the mean position of the sails, are in the plane of the wheel, and have on their extremities wrists 21, threaded to receive nuts 22, which confine on the said wrists the eyes 23ª of rods 23. Said rods converge forward and are attached to a collar, 24, adapted to rotate with the wheel, and supported between fixed collars 25 on the forward extremity of a horizontal governor-rod, 26, which extends axially through the wheel-hub 8 and its shaft 7 and projects at the rear of the housing 3. The rear extremity of the governor-rod 26 is slotted at 26ª to receive a vertical lever, 27, fulcrumed at 28.

To the upper end of the governor-lever 27 is attached a chain, 29, passing over a pulley, 30, and connected to the top of the vertical governor-rod 31, which is formed with a loop, 32, through which the horizontal governor-rod 26 passes without interfering with the vertical movement of the rod 31. The lower extremity of the rod 31 is connected to a lever, 33, held in any position to which it is set by a rack, 33ª, so as to graduate the pressure applied by the governor-lever 27 through the spring 34 to the horizontal rod 26, and thus regulate the feathering of the sails under the pressure of the wind. The spring 34 bears on a collar, 36, fixed on the governor-rod 26.

The sails 17 18 are connected in pairs by rods 37, pivoted to the extremities of their wider sides only, so that the pressure of the wind on the wider sides of both sets of sails, 17 and 18, will be communicated through the radial sail-shafts 16, cranks 20, rods 23, and collar 24 to the horizontal governor-rod 26.

The customary brace-rods, which tie the rim 15 of the wheel to the forward extremity of the hub, are shown at 48. The rotation of the wheel is communicated by a pinion, 38, to a beveled wheel, 39, on the vertical hollow shaft 40, either directly or through an intermediate wheel, 41, cast in one with the vertical beveled wheel 42, gearing with the horizontal beveled wheel 39. The intermediate wheels, 41 42, are useful in providing sufficient vertical distance between the horizontal governor-rod 36 and the gear-wheel 39 at the head of the vertical driving-shaft to permit the play of the vertical rod 31. If preferred, especially in large mills, the first wheel, 38, may be beveled and of sufficient diameter to gear directly with the horizontal beveled wheel 39.

To the housing 3 is hinged a pawl, 43, engaging with the fixed circular ratchet-rack 2, so as to secure the head of the mill against rotation under the action of the wind.

44 represents a vane jointed in a box, 45, formed on one side with an abutment for the vane-staff, rendering the vane rigid in that direction, but permitting its horizontal deflection in the other direction.

Upon the vane-staff is mounted a trigger, 47, engaging beneath the inclined head of the pawl 43, so as to retract said pawl from the rack 2 when the vane is deflected by the action of the wind, thus permitting the mill to turn and keep it at all times in the face of the wind.

46 is the customary stay chain or rod to support the vane.

The weight of the wheel is preferably sustained by one or more anti-friction wheels or rollers, 49, underneath it in front, and a similar wheel, 50, above it at back.

Having thus described my invention, the following is what I claim as new therein and desire to secure by Letters Patent:

1. The combination of hub 8, having the flange 9, the radial arms 11, extending therefrom, concentric rings 13 14 15, radial shafts 16, carrying sails 17 and having bearings on the inner ring, 13, and outer ring, 15, intermediate shafts, 19, carrying sails 18 and having bearings on the outer rings, 14 15, and the rods 37, connecting the sails 17 and 18, as set forth.

2. The combination of the hub 8, having flange 9, the radial arms 11, extending therefrom, three concentric rings, 13 14 15, radial shafts 16, formed with crank-arms 20 and wrists 21, rotary collar 24, rods 23, connecting the wrists with the collar, presser-rod 26, having fixed collars 25, short shafts 19, sails 17 and 18, and the rods 37, connecting said sails, as set forth.

3. In combination with the feathering sails, connecting-rods, and rotary collar, the horizontal presser-rod 26, having slot 26ª and collars 25 25 and 36, lever 27, having fulcrum 28 and passing through said slot, the spring 34, located on the presser-rod between the lever and collar 37, governor-rod 31, and chain 29, working over pulley 30 and connecting the lever to the governor-rod, as set forth.

4. The combination of the revolving mill-head 3 4, pawl 43, secured to the housing, the rack 2, hinged vane 44, and tripping device 47, operating substantially as and for the purpose set forth.

BLANCHARD CHAMBERLAIN.

Witnesses:
OCTAVIUS KNIGHT,
JNO. L. CONDRON.